(12) United States Patent
Mahaniok et al.

(10) Patent No.: US 8,825,663 B2
(45) Date of Patent: Sep. 2, 2014

(54) USING APPLICATION METADATA TO IDENTIFY APPLICATIONS OF INTEREST

(75) Inventors: Ihar Mahaniok, Zurich (CH); Bhaskar Mehta, Adliswil (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/530,539

(22) Filed: Jun. 22, 2012

(65) Prior Publication Data
US 2012/0290583 A1   Nov. 15, 2012

Related U.S. Application Data

(63) Continuation of application No. PCT/US2012/037129, filed on May 9, 2012.

(60) Provisional application No. 61/484,136, filed on May 9, 2011.

(51) Int. Cl.
| | |
|---|---|
| *G06F 7/00* | (2006.01) |
| *G06F 17/30* | (2006.01) |
| *G06F 9/445* | (2006.01) |
| *G06Q 30/02* | (2012.01) |
| *G06F 17/00* | (2006.01) |

(52) U.S. Cl.
CPC ...... *G06F 8/60* (2013.01); *G06Q 30/02* (2013.01); *Y10S 707/948* (2013.01)
USPC .................. 707/741; 707/754; 707/948

(58) Field of Classification Search
CPC .......... G06F 17/30864; G06F 17/30867; G06F 17/3089; G06F 17/30899; G06F 17/30902
USPC ........... 707/741, 754, 999.001–999.005, 948
See application file for complete search history.

(56) References Cited

U.S. PATENT DOCUMENTS

| | | |
|---|---|---|
| 4,977,598 A | 12/1990 | Doddington et al. |
| 6,185,543 B1 | 2/2001 | Galperin et al. |

(Continued)

FOREIGN PATENT DOCUMENTS

| | | |
|---|---|---|
| EP | 2230605 A1 | 9/2010 |
| WO | WO2012154838 A2 | 11/2012 |

(Continued)

OTHER PUBLICATIONS

Authorized Officer D. Van Rijssel. International Search Report in International Application No. PCT/US/2012/037129, dated Jul. 23, 2012, 9 pages.

(Continued)

*Primary Examiner* — Kannan Shanmugasundaram
(74) *Attorney, Agent, or Firm* — Fish & Richardson P.C.

(57) ABSTRACT

Methods, systems, apparatus, and computer storage mediums for receiving an initial index, the initial index associating each application of one or more applications with one or more applications of interest; for each application, receiving metadata associated with the application and receiving metadata associated with each of the one or more applications of interest; processing the metadata to selectively remove at least one of the one or more applications of interest from the initial index to provide a final index, the final index associating each application of the one or more applications with a remaining one or more applications of interest; storing the final index in memory; receiving a user selection of a particular application of the one or more applications; retrieving the one or more applications of interest based on the particular application using the final index; and providing the one or more applications of interest for display.

19 Claims, 6 Drawing Sheets

(56) References Cited

U.S. PATENT DOCUMENTS

| | | | |
|---|---|---|---|
| 6,675,382 | B1 | 1/2004 | Foster |
| 6,925,649 | B2 | 8/2005 | Schwalb et al. |
| 7,073,190 | B1 | 7/2006 | Malaure et al. |
| 7,113,917 | B2 | 9/2006 | Jacobi et al. |
| 7,130,734 | B2 | 10/2006 | Sah et al. |
| 7,523,099 | B1 | 4/2009 | Egnor et al. |
| 7,555,459 | B2 | 6/2009 | Dhar et al. |
| 7,594,006 | B2 | 9/2009 | Rolia et al. |
| 7,644,013 | B2 | 1/2010 | Nastacio et al. |
| 7,685,012 | B2 | 3/2010 | Wilson |
| 7,792,685 | B2 | 9/2010 | Andino et al. |
| 7,831,695 | B1 | 11/2010 | Burr et al. |
| 7,890,870 | B1 | 2/2011 | Metters et al. |
| RE42,357 | E | 5/2011 | Malaure et al. |
| 7,945,545 | B1 | 5/2011 | Sorkin et al. |
| 8,169,481 | B2 | 5/2012 | Ozdemir et al. |
| 8,175,802 | B2 | 5/2012 | Forstall et al. |
| 8,245,239 | B2 | 8/2012 | Garyali et al. |
| 2002/0063735 | A1 | 5/2002 | Tamir et al. |
| 2002/0144261 | A1 | 10/2002 | Schwalb et al. |
| 2002/0152200 | A1 | 10/2002 | Krichilsky et al. |
| 2002/0194096 | A1 | 12/2002 | Falcone et al. |
| 2003/0192029 | A1 | 10/2003 | Hughes |
| 2004/0093595 | A1 | 5/2004 | Bilange |
| 2004/0143508 | A1* | 7/2004 | Bohn et al. ............ 705/26 |
| 2005/0091094 | A1 | 4/2005 | Wilson |
| 2005/0120113 | A1 | 6/2005 | Bunch et al. |
| 2005/0240668 | A1 | 10/2005 | Rolia et al. |
| 2006/0031248 | A1* | 2/2006 | Vinberg et al. .......... 707/103 R |
| 2006/0271618 | A1 | 11/2006 | Kokubo et al. |
| 2007/0208583 | A1 | 9/2007 | Ward |
| 2007/0233782 | A1 | 10/2007 | Tali |
| 2009/0163183 | A1 | 6/2009 | O Donoghue et al. |
| 2009/0276332 | A1 | 11/2009 | Gharabally et al. |
| 2010/0011352 | A1* | 1/2010 | Chu et al. ............ 717/174 |
| 2010/0042616 | A1* | 2/2010 | Rinearson ............ 707/5 |
| 2010/0058468 | A1* | 3/2010 | Green et al. ............ 726/22 |
| 2010/0076849 | A1 | 3/2010 | Bishop |
| 2010/0146442 | A1 | 6/2010 | Nagasaka et al. |
| 2010/0250337 | A1 | 9/2010 | Kassaei |
| 2010/0262467 | A1 | 10/2010 | Barnhill et al. |
| 2010/0262619 | A1* | 10/2010 | Zargahi et al. ............ 707/770 |
| 2010/0280892 | A1 | 11/2010 | Uzunalioglu et al. |
| 2010/0306191 | A1 | 12/2010 | LeBeau et al. |
| 2010/0306762 | A1* | 12/2010 | Lindberg et al. ............ 717/176 |
| 2010/0312817 | A1* | 12/2010 | Steakley ............ 709/202 |
| 2011/0077951 | A1 | 3/2011 | Tullis |
| 2011/0087975 | A1 | 4/2011 | Karsten |
| 2011/0105150 | A1 | 5/2011 | Moon et al. |
| 2011/0106775 | A1* | 5/2011 | Arbo et al. ............ 707/695 |
| 2011/0145920 | A1 | 6/2011 | Mahaffey et al. |
| 2011/0167117 | A1 | 7/2011 | Hart et al. |
| 2011/0307354 | A1* | 12/2011 | Erman et al. ............ 705/27.1 |
| 2011/0320307 | A1 | 12/2011 | Mehta et al. |
| 2012/0072283 | A1* | 3/2012 | DeVore et al. ............ 705/14.49 |
| 2012/0290441 | A1 | 11/2012 | Mahaniok et al. |
| 2012/0290584 | A1 | 11/2012 | De Bona et al. |
| 2012/0291022 | A1 | 11/2012 | Mehta et al. |
| 2012/0316955 | A1 | 12/2012 | Panguluri et al. |
| 2013/0268397 | A1 | 10/2013 | Mehta |
| 2014/0019442 | A1 | 1/2014 | Mahaniok |

FOREIGN PATENT DOCUMENTS

| | | | |
|---|---|---|---|
| WO | WO2012154843 | A1 | 11/2012 |
| WO | WO2012154848 | A1 | 11/2012 |
| WO | WO2012154856 | A1 | 11/2012 |
| WO | WO13169245 | A2 | 11/2013 |

OTHER PUBLICATIONS

Authorized Officer E Sagno-Pabis. International Search Report in International Application No. PCT/US2012/037116, dated Jul. 11, 2012, 11 pages.

Authorized Officer D. Van Rijssel. International Search Report in International Application No. PCT/US2012/037109, dated Jul. 23, 2012, 9 pages.

Cutler; "Apple May have Tweaked App Store Ranking Algorithm, Making Downloads Matter Less," Apr. 18, 2011. [Retrieved on Jun. 29, 2012]. Retrieved from the Internet: URL: http://www.insidemobileapps.com/2011/04/18/apple-app-store-ranking-changes, 6 pages.

Peck, "What is the algorithm behind the App Store rankings," Oct. 27, 2010. [Retrieved on Jun. 29, 2012]. Retrieved from the Internet: URL: http://www.quora.com/What-is-the algorithm-behind-the-App-Store-rankings, 2 pages.

Ihar Mahaniok et al., U.S. Appl. No. 13/530,242, entitled "Using Application Market Log Data to Identify Applications of Interest," filed on Jun. 22, 2012, 39 pages (including specification, claims, abstract and drawings).

Bhaskar Mehta et al., U.S. Appl. No. 13/530,204, entitled "Generating Application Recommendations Based on User Installed Applications," filed on Jun. 22, 2012, 40 pages (including specification, claims, abstract and drawings).

Fabio De Bona et al., U.S. Appl. No. 13/530,559, entitled "Recommending Applications for Mobile Devices Based on Installation Histories," filed on Jun. 22, 2012, 30 pages (including specification, claims, abstract and drawings).

Authorized Officer Jung Soo Hwan, International Search Report and Written Opinion in International Application No. PCT/US2012/037100, dated Feb. 19, 2013, 11 pages.

Roush, Wade, Search Beyond Google. Technology Review 107.2 (Mar. 2004): 34-45. Downloaded from ProQuestDirect on the Internet on Jan. 13, 2013, 5 pages.

Authorized Officer Lingfei Bai. International Preliminary Report on Patentability in International Application No. PCT/US2012/037109, dated Nov. 21, 2013, 6 pages.

Authorized Officer Nora Lindner. International Preliminary Report on Patentability in International Application No. PCT/US2012/037129, dated Nov. 21, 2013, 6 pages.

Authorized Officer Kihwan Moon. International Preliminary Report on Patentability in International Application No. PCT/US2012/037100, dated Nov. 21, 2013, 7 pages.

Authorized Officer Philippe Becamel. International Preliminary Report on Patentability in International Application No. PCT/US2012/037116, dated Nov. 21, 2013, 6 pages.

Authorized Officer Blaine R. Copenheaver, International Search Report and Written Opinion in International Application No. PCT/US2012/037122, dated Jan. 4, 2013, 12 pages.

* cited by examiner

USING APPLICATION METADATA TO IDENTIFY APPLICATIONS OF INTEREST

PRIORITY CLAIM

This application is a continuation of, and claims priority to under 35 U.S.C. 120, International Application No. PCT/U.S.2012/037129, filed May 9, 2012, which in turn claims the benefit of U.S. Provisional Patent Application Ser. No. 61/484,136, filed on May 9, 2011, the disclosures of which are expressly incorporated herein by reference in their entirety.

TECHNICAL FIELD

The present disclosure relates to identifying one or more applications as being potentially of interest to a user in view of a selected application within an application marketplace.

BACKGROUND

Mobile computing devices (or simply "mobile devices") may run a variety of software applications that extend existing device capabilities and that add new capabilities. Many types of applications are generally available, such as applications for information retrieval, communications and entertainment. Applications may be created by mobile device manufacturers and/or third parties (e.g., application developers), and may be pre-installed by the manufacturer, or may be downloaded and installed by device users.

Users may discover new applications through an interface associated with an on-line application marketplace, by browsing a catalog of available applications. Additionally, information about new applications is generally available through advertising, industry reviews, "top 10" and "best" lists, and through word-of-mouth referrals. Upon learning of a new application, users may obtain, install, and use full versions of the applications, or users may access demonstration versions of the application that allow the users to try the application out with or without purchasing. Over time, users may keep applications, upgrade applications (e.g., from a demonstration version to a full version), and may delete applications that are no longer wanted.

SUMMARY

Innovative aspects of the subject matter described in this specification may be embodied in methods that include the actions of receiving an initial index, the initial index associating each application of one or more applications with one or more applications of interest, the applications being executable on a mobile computing device, for each application, receiving metadata associated with the application and receiving metadata associated with each of the one or more applications of interest, processing the metadata to selectively remove at least one of the one or more applications of interest from the initial index to provide a final index, the final index associating each application of the one or more applications with a remaining one or more applications of interest, storing the final index in computer-readable memory, receiving a user selection of a particular application of the one or more applications, retrieving the one or more applications of interest based on the particular application using the final index, and providing the one or more applications of interest for display.

Other embodiments of these aspects include corresponding systems, apparatus, and computer programs, configured to perform the actions of the methods, encoded on computer storage devices.

These and other embodiments may each optionally include one or more of the following features. For instance, the metadata includes filtering metadata; processing the metadata includes: comparing filtering metadata of at least one application of interest of the one or more applications of interest to filtering criteria, and selectively removing the at least one application of interest from the initial index based on the comparing; the filtering metadata includes title metadata corresponding to a title of the at least one application of interest and the at least one application of interest is removed from the initial index when the title is blank; the filtering metadata includes description metadata corresponding to a description of the at least one application of interest and the at least one application of interest is removed from the initial index when the description is blank; the filtering metadata includes install metadata corresponding to a number of times the at least one application of interest has been installed on a computing device and the at least one application of interest is removed from the initial index when the number of times is less than a threshold number of times; the filtering metadata includes rating metadata corresponding to ratings of the at least one application of interest; the rating metadata includes an average rating of the at least one application of interest and the at least one application of interest is removed from the initial index when the average rating is less than a threshold average rating; the rating metadata comprises a number of ratings corresponding to the at least one application of interest and the at least one application of interest is removed from the initial index when the number of ratings is less than a threshold number of ratings; the filtering metadata includes developer rating metadata corresponding to a rating of a developer of the at least one application of interest and the at least one application of interest is removed from the initial index when the rating is less than a threshold rating; processing the metadata includes: comparing filtering metadata of an application of interest to filtering metadata of an application of the one or more applications, and selectively removing the at least one application of interest from the initial index based on the comparing; the filtering metadata includes category metadata and the application of interest is removed from the initial index when a category of the application of interest is different from a category of the application; the filtering metadata includes content metadata and the application of interest is removed from the initial index when a content of the application of interest is different from a content of the application; the content includes adult content; the filtering metadata includes locale metadata and the application of interest is removed from the initial index when a locale associated with the application of interest is different from a locale associated with the application; the metadata include scoring metadata; processing the metadata includes: calculating a metadata score based on the scoring metadata, the metadata score corresponding to an application and an application of interest associated with the application in the initial index, calculating an overall score based on the metadata score, and removing the application of interest from the initial index when the overall score is less than a threshold overall score; the scoring metadata includes at least one of title metadata, description metadata and permission metadata; the metadata score is calculated based on at least one of a title similarity score, a concept similarity score, a permission similarity score, and title and description similarity scores; and the overall score is further calculated based on a normalized weight that corresponds to the application and the application of interest.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes systems and methods for identifying one or more applications as being related to a selected application within an application marketplace. In some implementations, users of computing devices (e.g., mobile computing devices) can search for executable applications in an application marketplace and can download and install these applications on the computing device. However, the users may often find it cumbersome to search through the application marketplace to discover other applications that can be suggested in view of a selected application.

A degree of correspondence between a selected application and a target application is based on query log data and application metadata. If the degree of correspondence between the selected application and the target application is sufficient, the target application is suggested (e.g., potentially of interest to a user) in view of the selected application. For example, applications that can be used for the same or similar purpose can be suggested in view of the other applications even though there may be no other direct correlation (e.g., same developer) between the applications.

In some implementations, a user can search for applications that are available through the application marketplace by entering search terms into a query field provided in a user interface of the application marketplace. A resultant query can be transmitted to the application marketplace, which searches available applications to identify one or more applications that correspond to the query. The application marketplace can return a listing of the one or more applications to the computing device. The user can then select an application from the listing displayed on the computing device. In response to the user selection, detailed information regarding the selected application can be presented to the user via the computing device. Further, a list of one or more suggested applications in view of the selected application can also be displayed to the user in response to the user selection, as discussed in further detail below. The user can initiate installation of the selected application on the computing device.

Information relating to the search queries, the selection of the applications for display of detailed information, application installations, application content, application ratings and the like can be stored in a database. The information can account for the search queries, requests for detailed information and installations of multiple users across multiple devices. As discussed in further detail below, application information can be processed to identify applications as suggested applications in view of a selected application. Suggested applications can be displayed in the application marketplace as being suggested applications in view of a selected application.

Figure 1:
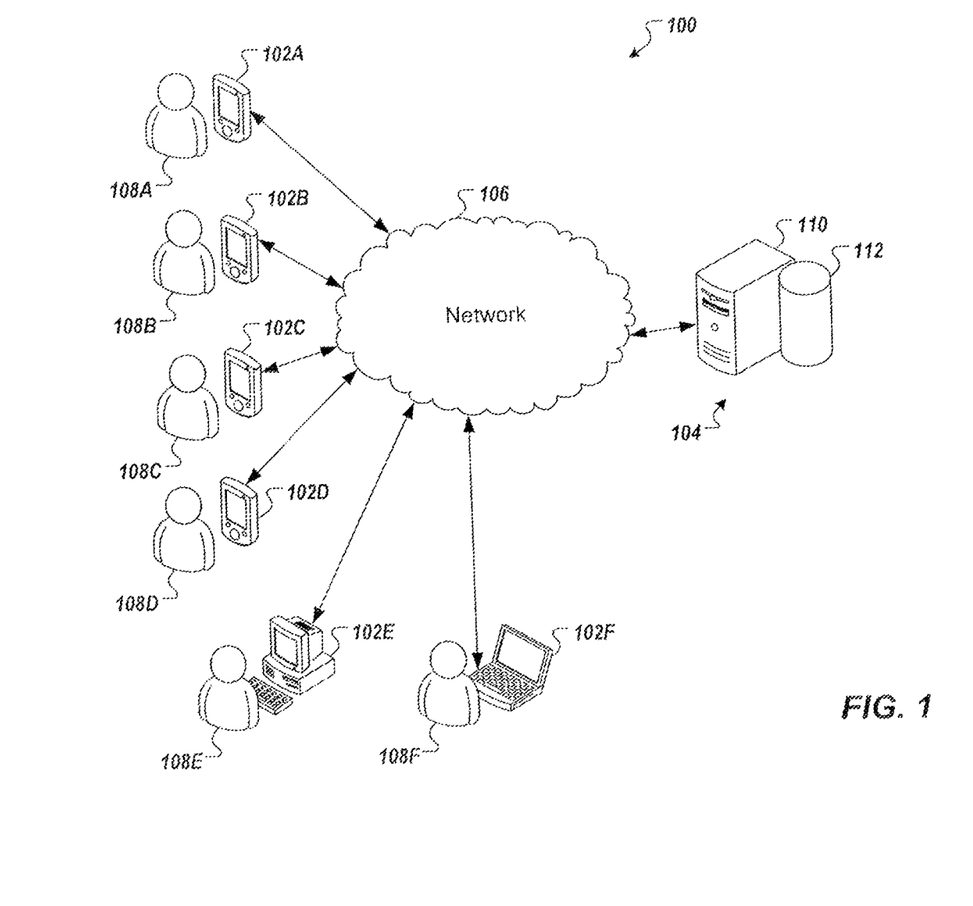
FIG. 1 depicts an example system that can execute implementations of the present disclosure.

FIG. 1 is a diagram of an example system 100 that can execute implementations of the present disclosure. The system 100 includes computing devices 102A-102F that can each communicate with a server system 104 over a network 106. Each of the computing devices 102A-102F includes an associated user 108A-108F, respectively. The network 106 can include a large computer network, such as a local area network (LAN), a wide area network (WAN), the Internet, a cellular network, or a combination thereof connecting any number of mobile computing devices, fixed computing devices and server systems. The server system 104 includes one or more computing devices 110 and one or more machine-readable repositories, or databases 112.

In the example system 100, the computing devices 102A-102D are illustrated as mobile computing devices, the computing device 102E is illustrated as a desktop-type computing device and the computing device 102F is illustrated as a laptop-type computing device. It is appreciated, however, that the computing devices 102A-102F can each include any type of computing device such as a desktop computer, a laptop computer, a handheld computer, a personal digital assistant (PDA), a cellular telephone, a network appliance, a camera, a smart phone, an enhanced general packet radio service (EG-PRS) mobile phone, a computing table device, a media player, a navigation device, an email device, a game console, or a combination of any two or more of these data processing devices or other data processing devices.

The computing devices 102A-102F enable the respective users 108A-108F to interact with an application marketplace. An example application marketplace includes Google Play (formerly know as the Android Market) provided by Google Inc. In some implementations, the application marketplace can include a website that is hosted on one or more servers (e.g., the server system 104) and that is accessed using a computing device (e.g., computing devices 102A-102F). In some implementations, the application marketplace can be provided as an application that is executed on a computing device (e.g., computing devices 102A-102F), and that retrieves application information from one or more servers (e.g., the server system 104).

The application marketplace can advertise applications that are available for download to and installation on one or more of the computing devices 102A-102F. For example, the user 108A of the computing device 102A can interact with the application marketplace to view and/or find applications of interest. For example, the user 102A can input a search query to the application marketplace. The search query can be processed (e.g., by one or more server systems hosting, or otherwise providing data to the application marketplace) to identify one or more applications corresponding to the search query. Information corresponding to the one or more applications can be transmitted to the computing device 102A for display to the user 108A. As another example, the application marketplace can display categories of applications (e.g., most recent applications, most downloaded applications, top free applications, top paid applications, featured applications, entertainment, productivity, business, education and the like). In response to selecting a particular category, information corresponding to one or more applications within the particular category can be transmitted to the computing device 102A for display to the user 108A.

Continuing with the example above, the user 108A can select a particular application from the one or more displayed applications to view further detail about the application and/or to download and install the application to the computing device 102A. For example, in response to user input, further detail regarding a selected application can be displayed. Examples of further detail can include a description of the application, user ratings of the application, user reviews, application screenshots, as well as other applications that have been determined to be related to the selected application. As discussed in further detail herein, implementations of the present disclosure are directed to determining whether two applications are related.

Figure 2:
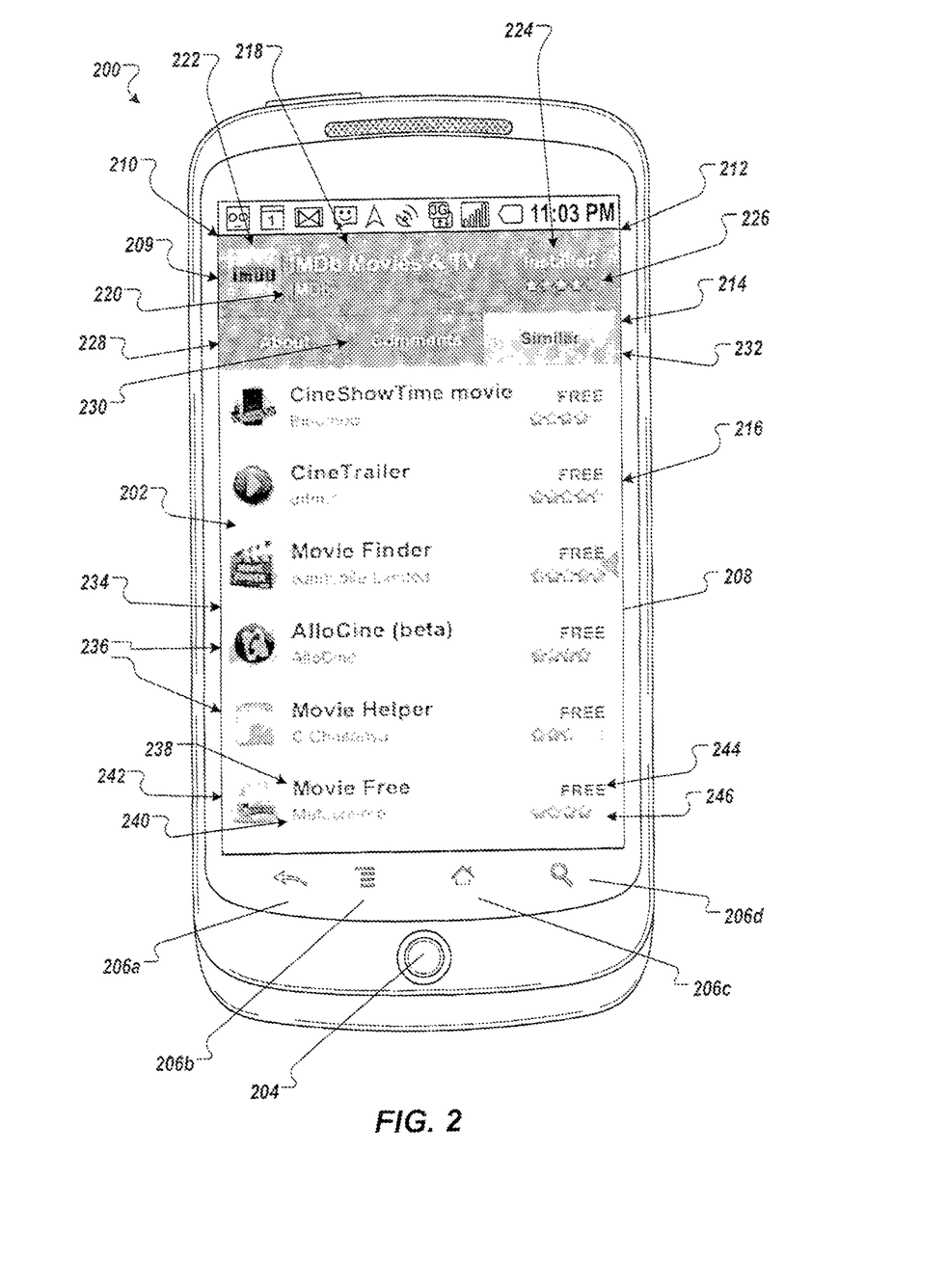
FIG. 2 depicts an example mobile device for displaying applications identified as being suggested applications in view of a selected application.

FIG. 2 depicts an example mobile device 200 for displaying applications identified as being suggested application in view of a selected application. The mobile device 200 can correspond to the computing devices 102A-102D of FIG. 1. The mobile device 200 includes a display 202, a trackball 204 and navigations buttons 206a-206d. The display 202 displays a graphical user interface (GUI) 208. The GUI 208 provides an interface for a user (e.g., the users 108A-108D) to interact with an operating system and applications stored on a memory of the mobile device 200. An example operating system includes the Android Operating System provided by Google Inc. The user can interact with the GUI 208 to navigate a listing of the applications stored in memory of and executable on the mobile device 200, select an application for execution by a processor of the mobile device 200, provide input to the applications during execution of the application, and the like.

The user of the mobile device 200 navigates the GUI 208 via the display 202, the trackball 204 and navigations buttons 206a-206d, and/or other input means (e.g., acoustic and/or tactile). In some implementations, the display 202 is a touch-screen display. The trackball 204 controls a cursor that can be part of the GUI 208 for selecting items displayed on the GUI 208. The navigations buttons 206a-206d have various implementations dependent upon the specific operating system stored on the mobile device 200. In some implementations, the navigation button 206a provides a "previous" function that returns the current state of the GUI 208 to a previous state of the GUI 208; the navigation button 206b provides a menu function; the navigation button 206c provides a home function that brings the GUI 208 to a "home screen;" and the navigation button 206d provides a searching function.

The mobile device 200 stores an application marketplace application. The application marketplace application can be provided as a client-side application that enables communication with an application marketplace that is provided as a back-end application (e.g., executed on one or more server systems). The application marketplace application provides a listing of applications to the user that are available for download to and installation on the mobile device 200. Specifically, the user selects the application marketplace application by navigating the GUI 208. The user can select the application marketplace application (e.g. launch the application marketplace application for execution) by any means provided by the operating system stored on the mobile device 200. Upon the user selecting the application marketplace application, the application marketplace application can display a query field in the GUI 208. The user can enter search terms into the query field to generate a query. The search terms can be related to a specific application the user wishes to obtain more information about, including possible installation of the application on the mobile device 200. In some implementations, the search terms relate to a specific application, such as search terms "Google Earth" relating to the Google Earth application. In some implementations, the search terms can be related to a category of applications that the user is interested in, such as the search terms including "Shopping" in which multiple applications can relate to the search terms. The multiple applications can include, among others, "Google Shopper" and "Amazon Mobile," for example.

After the user enters the search terms into the query field, the application marketplace application returns an updated interface to the GUI 208. Specifically, in response to the query, the GUI 208 can include a listing of applications as search results that are identified as corresponding to the search terms. The user can select an application from the search results. In response to the selection of a specific application, the application marketplace application provides an updated interface to the GUI 208 relating to the selected application 209. Specifically, the GUI 208 can include an application interface 210 including information specific to the selected application 209.

In some implementations, a listing of applications can be displayed by the GUI 208 in response to other user input and/or a default listing of applications can be presented. For example, upon selection of the application marketplace application on the mobile device 200, a welcome screen can be displayed, which includes a default listing of applications. The default listing of applications can include, for example, the top-most searched applications, or the top-most installed applications. Further, listings of applications can be displayed based on category. For example, the user can select a particular category (e.g., news, books, entertainment), and a listing of applications corresponding to the selected category can be displayed. An application can be selected from any listing of applications, or otherwise, however presented on the GUI 208.

The application interface 210 includes an application heading portion 212, a tabbed portion 214 and a content portion 216. The heading portion 212 includes summary information specific to the selected application 209. The application-specific information can include, for example, an application name 218, an application developer 220, an application icon 222, an install status 224 and a rating 226. The install status 224 includes information relating to whether the selected application 209 is currently installed on the mobile device 200. In some implementations, the rating 226 is a rating provided by the user of the mobile device 200 when the selected application 209 is currently installed or was previously installed on the mobile device 200. In some implementations, the rating 226 is a rating average provided by multiple users across multiple mobile devices.

The tabbed portion 214 includes, for example, an about tab 228, a comments tab 230 and a similar (or suggested) tab 232. When a tab of the tabbed portion 214 is selected by the user of the mobile device 200, contents related to the selected tab are displayed in the content portion 216. When selected, the about tab 228 displays content in the content portion 216 relating to a description about the selected application 209. The description is provided by a developer of the selected application 209. When selected, the comments tab 230 displays content in the content portion 216 relating to comments provided by other users who have previous experience with the selected application 209 on a respective mobile device. The comments can include text, audio, video and the like. Further, the comments can include a rating of the selected application 209. When selected, the similar (or suggested) tab 232 displays content in the content portion 216 related to a listing 234 of suggested applications 236 in view of the selected application 209. Specifically, the similiar tab 232 displays the listing 234 of suggested applications 236 that have been identified as being suggested in view of the selected application 209, as detailed further below. The listing 234 can be provided as a scrollable list. The user of the mobile device 200 can scroll the listing 234 vertically such that the listing 236 reveals additional related applications 236 while hiding a portion of the currently displayed related applications 236. The listing 234 of suggested applications 236 can include application-specific information for each suggested application 236 such as an application name 238, an application developer 240, an application icon 242, a pricing 244 and a rating 246.

Figure 3:
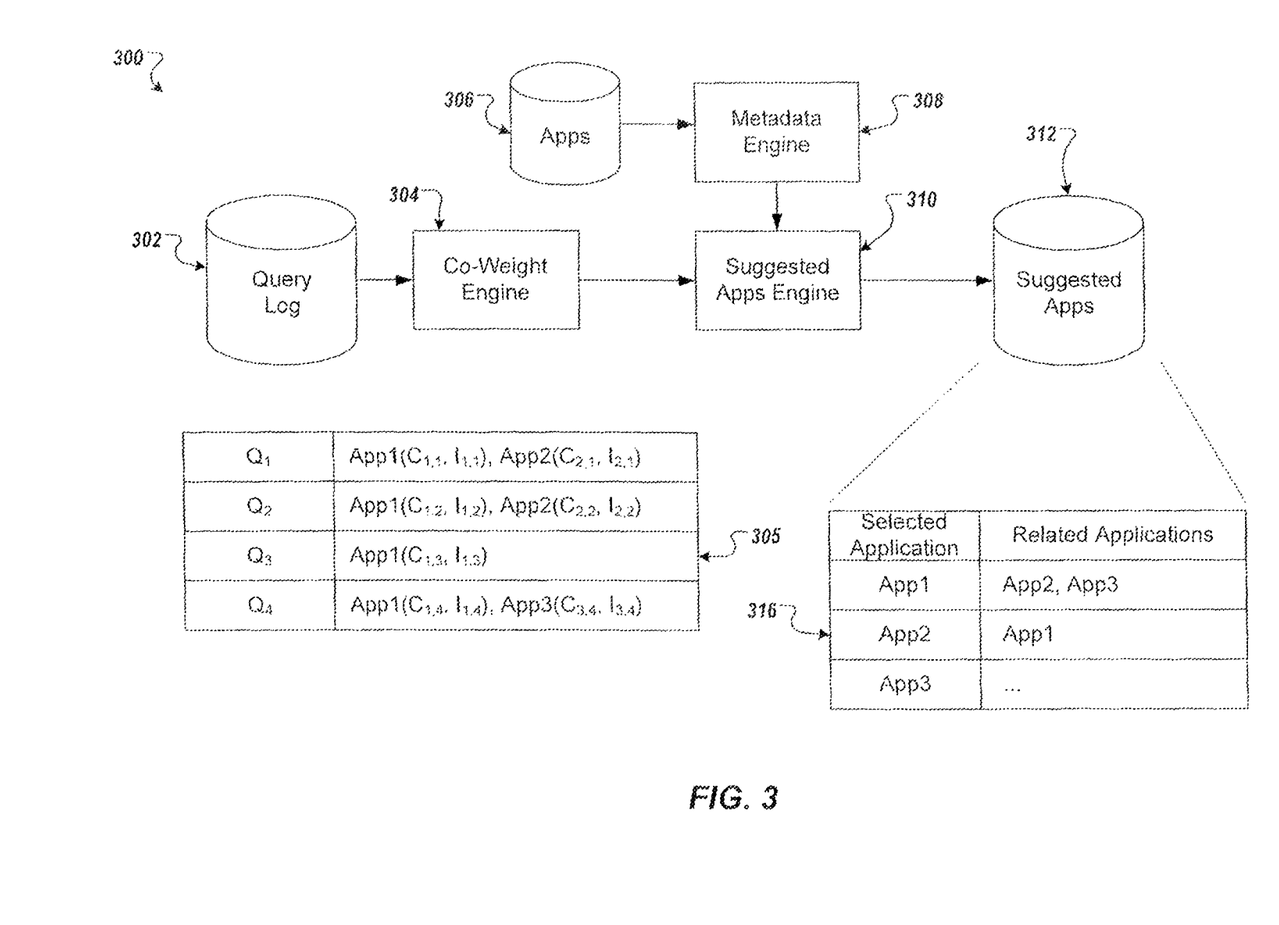
FIG. 3 is a block diagram of a system that includes example components for identifying one or more applications as suggested applications in view of a selected application.

FIG. 3 is a block diagram of a system 300 that includes example components for identifying one or more applications as suggested applications in view of a selected application. The system 300 includes a query log database 302, a co-weight engine 304, an application database 306, a metadata engine 308, a suggested applications engine 310, and a suggested applications database 312.

The query log database 302 provides information to the co-weight engine 304 in the form of a query log. The co-weight engine 304 processes the query log to generate an index of co-weights of applications (e.g., a degree of correspondence between applications). The index of co-weights of applications includes, for each application, a list of co-weights of applications that are suggested in view of the application. For example, a first application in the index of co-weights of applications includes a corresponding first list of co-weights of applications that are suggested in view of the first application, and a second application in the index of co-weights of applications includes a corresponding second list of applications that are suggested in view of the second application. The query log database 302 includes information relating to queries input to the application marketplace application. The information can include, for example, events. Example events can include clicks or installs, discussed in further detail herein. In some implementations, and for a given event, the query log can further include a note indicating that the event originated from a position within a list of search results for a particular query. The query log is processed to generate a first mapping 305 of queries to a set of applications with the number of clicks and installs.

The application database 306 stores information corresponding to the applications available for download to and installation on computing devices (e.g., the mobile device 200 of FIG. 2). The application database 306 provides an initial listing of applications stored in the application database 306 and information relating to the applications to the metadata engine 308. The metadata engine 308 processes this information to provide relevant metadata corresponding to each application. The metadata can include, for example, application name, developer name, rating, the price, category, whether an application is of a particular content (e.g., adult), and the like. The metadata engine 308 provides the metadata of the applications to the suggested applications engine 310.

The suggested applications engine 310 receives the initial listing of applications stored in the application database 306 and associated metadata from the metadata engine 308 and the index of co-weights of applications from the co-weight engine 304. In some implementations, the application database 206 provides the initial listing of applications to the suggested applications engine 310. The suggested applications engine 310 removes application pairs from the initial listing of applications that are not identified as suggested based on the metadata to generate a filtered listing of application pairs. The suggested applications engine 310 processes the filtered listing of application pairs in view of the index of co-weights of applications to generate an index of suggested applications, as discussed in further detail below. The suggested applications engine 310 provides the index of suggested applications to the suggested applications database 312. The suggested applications database 312 stores the index of suggested applications. The suggested applications database 312 makes the index of suggested applications available to the application marketplace.

To generate the index of co-weights of applications, the co-weight engine 304 determines the co-weights between application pairs based on information provided from the query log database 302. As discussed above, information (e.g., events) in the query log database 302 can be processed to provide the first mapping 305 relating each query (Q) to the applications (App) that were identified as being a search result of the query. The first mapping 305 further includes, for each application of each corresponding query, a number of clicks (C) and a number of installs (I) of the application. For example, the query $Q_1$ of the first mapping 305 generated search results that included App1 and App2 (i.e., when users entered the query $Q_1$, App1 and App2 were presented as search results corresponding to the query $Q_1$). App1 includes a corresponding number of clicks ($C_{1,1}$) and a corresponding number of installs ($I_{1,1}$) that resulted from App1 being a search result of the query $Q_1$. Likewise, App2 includes a corresponding number of clicks ($C_{2,1}$) and a corresponding number of installs ($I_{2,1}$) that resulted from App2 being a search result of the query $Q_1$. As used herein, a click indicates that a searching user at least clicked on the application from the search results to garner more information regarding the application. As used herein, an install indicates that a searching user actually downloaded and installed the application.

The co-weight engine 304 generates a hash for each of the queries (Q) of the first mapping 305 to generate a second mapping from the query hashes to the applications. For each application of each query, the co-weight engine 304 determines a weighting for each application based on the number of clicks and the number of installs to generate a third mapping from the query hashes to the applications. The co-weight engine 304 determines the total weight for each application across each of the query hashes, determines co-weights for each application pair, and normalizes the co-weights for each application pair. If the normalized weight of a particular application pair is above a threshold, the co-weight engine 304 includes the normalized weight for the particular application pair in the index of co-weights of applications. If the normalized weight of the particular application pair is less than the threshold, the co-weight engine 304 does not include the normalized weight of the particular application pair in the index of co-weights of applications.

An example of generating a first mapping is provided below. The co-weight engine 304 generates the first mapping (e.g., the first mapping 305) from the queries (Q) to the applications (App) that are provided as search results in response to the respective query based on information provided from the query log database 302. For simplicity of description, the present example includes four queries ($Q_1$-$Q_4$); however, the example applies to any number of queries. Specifically, for each unique query ($Q_n$), a mapping is generated to applications ($App_m$) provided as search results of the corresponding query. In example, the queries are mapped to the applications as follows:

First Mapping $Q_1 \rightarrow$ App1 $(C_{1,1}, I_{1,1})$, App2 $(C_{2,1}, I_{2,1})$;
$Q_2 \rightarrow$ App1 $(C_{1,2}, I_{1,2})$, App2 $(C_{2,2}, I_{2,2})$;
$Q_3 \rightarrow$ App1 $(C_{1,3}, I_{1,3})$; and
$Q_4 \rightarrow$ App1 $(C_{1,4}, I_{1,4})$, App3 $(C_{3,4}, I_{3,4})$.

It is appreciated that the first mapping provided above is merely an example for purposes of illustration and the number of applications that can be mapped to a particular query is not limited to the example number of applications provided therein.

For each application m provided in response to query n, $C_{m,n}$ indicates the total of times the application m was clicked on and $I_{m,n}$ indicates the total number of times the application m was installed on devices (e.g., mobile computing devices). A click of an application, or otherwise selection of the application by the user, includes displaying detailed information regarding the "clicked on" application to the user.

The co-weight engine 304 cleans the queries and generates a hash for each of the queries of the first mapping to provide a second mapping from the query hashes to the applications. In some implementations, cleaning of the queries can include removing punctuation from queries, reordering search terms of the queries, removing duplicate terms in the search queries, and the like. Continuing with the example above, the second mapping can be provided as follows:

Second Mapping

Hash $1 \rightarrow$ App1 $(C_{1,1}, I_{1,1})$, App2 $(C_{2,1}, I_{2,1})$
Hash $2 \rightarrow$ App1 $(C_{1,2}, I_{1,2})$, App2 $(C_{2,2}, I_{2,2})$
Hash $3 \rightarrow$ App1 $(C_{1,3}, I_{1,3})$
Hash $4 \rightarrow$ App1 $(C_{1,4}, I_{1,4})$, App3 $(C_{3,4}, I_{3,4})$ For each application of each hash, the co-weight engine 304 determines a weighting based on the number of clicks and the number of installs to provide a third mapping. Specifically, the co-weight engine 304 determines the weight ($w_{m,n}$) for each application (Appm). In some implementations, the weight can be determined in accordance with the following relationship:

$$w_{m,n} = C_{m,n} + \alpha I_{m,n}$$

The variable $\alpha$ alters the weighting applied to the number of installs for the application. In some implementations, the value of $\alpha$ can be greater than 1 such that the number of installs of the application is weighted more heavily than the number of clicks for the application. The third mapping can be provided as follows:

Third Mapping

Hash $1 \rightarrow$ App1 $(W_{1,1})$, App2 $(w_{2,1})$
Hash $2 \rightarrow$ App1 $(w_{1,2})$, App2 $(w_{2,2})$
Hash $3 \rightarrow$ App1 $(w_{1,3})$
Hash $4 \rightarrow$ App1 $(w_{1,4})$, App3 $(w_{3,4})$ The co-weight engine 304 determines the total weight for each application across each of the query hashes. The co-weight engine 304 sums the squares of each weight for the applications across all of the query hashes. Specifically, the total weight for each application can be determined based on the following relationships:

$$App1 \rightarrow tw_1 = (w_{1,1})^2 + (w_{1,2})^2 + (w_{1,3})^2 + (w_{1,4})^2$$

$$App2 \rightarrow tw_2 = (w_{2,1})^2 + (w_{2,2})^2$$

$$App3 \rightarrow tw_3 = (w_{3,4})^2$$

The co-weight engine 304 determines co-weights for each application pair. The co-weight $aw_{x,y}$ can be determined based on the following relationship:

$$aw_{x,y} = \text{sum}(w_{x,i} * w_{y,i})$$

where x=1, m; y=1, m; and i=1, . . . , n. By way of non-limiting example, the co-weight $aw_{1,2}$ between App1 and App2 can be determined as:

$$aw_{1,2} = w_{1,1} * w_{2,1} + w_{1,2} * w_{2,2} + w_{1,3} * w_{2,3} + w_{1,4} * w_{2,4}$$

However, in the current non-limiting example, the weights $w_{2,3}$ and $w_{2,4}$ are zero (i.e., weights $w_{2,3}$ and $w_{2,4}$ are not present in the current non-limiting example). Thus, the co-weight $aw_{1,2}$ between App1 and App2 is:

$$aw_{1,2} = w_{1,1} * w_{2,1} + w_{1,2} * w_{2,2}$$

Continuing with the present example, the co-weight engine 304 determines the co-weights for each application to be as follows:

App1 $\rightarrow$ App2($aw_{1,2}$), App3($aw_{1,3}$)
App2 $\rightarrow$ App1($aw_{2,1}$)
App3 $\rightarrow$ App1($aw_{3,1}$)

The co-weight engine 304 normalizes the co-weights for each application pair. The normalized co-weights are as follows:

App1 $\rightarrow$ App2($nw_{1,2}$), App3($nw_{1,3}$)
App2 $\rightarrow$ App1($nw_{2,1}$)
App3 $\rightarrow$ App1($nw_{3,1}$)

where $nw_{x,y} = (aw_{x,y} / (tw_x + tw_y))$.

In some implementations, the normalized weight is a factor identifying a degree to which applications in an application pair are related. The normalized weight for each application pair can be considered a score and can be compared to a threshold normalized weight. If the normalized weight for a particular application pair is above the threshold normalized weight, the co-weight engine 304 outputs the co-weight of the particular application pair in the index of co-weights of applications. If the normalized weight for the particular application pair is less than the threshold normalized weight, the co-weight engine 304 does not output the co-weight of the particular application pair in the index of co-weights of applications. In an example, if $nw_{1,2}$ is greater than a threshold $nw_{THR}$, the co-weight engine 304 includes the co-weight $nw_{1,2}$ in the index of co-weights of applications. If, however, $nw_{1,2}$ is less than the threshold $nw_{THR}$, the co-weight engine 304 does not include the co-weight $nw_{1,2}$ in the index of co-weights of applications.

The co-weight engine 304 generates index of co-weights of applications based on the normalized co-weights that have a normalized weight above the threshold normalized weight. As discussed above, the index of co-weights of applications includes, for each application, a list of co-weights of applications that are above the threshold normalized weight. Continuing with the example above, App1 would include a corresponding list of co-weights of suggested applications, which list includes the normalized co-weights of App2 and App3. App2 would include a corresponding list of co-weights of suggested applications, which list includes the normalized co-weights of App1; and App3 would include a corresponding list of co-weights of suggested applications, which list includes the normalized co-weight of App1.

The suggested applications engine 310 receives the initial listing of applications stored in the application database 306 and associated metadata and the index of co-weights of applications. The metadata can include filter metadata and/or scoring metadata. The filter metadata includes metadata used to filter (e.g. remove) application pairs from the initial listing of applications, as described in detail below. The scoring metadata includes metadata used to determine, in conjunction with the normalized co-weight, an overall score of the application pair for identifying either application of the applications of an application pair as suggested in view of selection of the other application, as described in detail below. More specifically, the scoring metadata can be used to generate a metadata score, as discussed in further detail below. Certain metadata can be provided as both filter metadata and scoring metadata (i.e., can be used for both filtering and score calculation).

In some implementations, the suggested applications engine 310 compares the filter metadata of applications in the initial listing of applications to generate a filtered listing of application pairs. If the filter metadata of the applications of a particular application pair correspond, the related applications engine 310 includes the particular application pair in the filtered listing of application pairs. If the filter metadata of the applications of the particular application pair do not correspond, the related applications engine 310 does not include the particular application pair in the filtered listing of application pairs. Further, in some implementations, if the filter metadata of any application of the particular application pair is not above a threshold, described in detail below, the application pair is removed from the filtered listing of application pairs.

Filter metadata can include, for example, category metadata, content metadata, title metadata, description metadata, install metadata, rating metadata, locale metadata and developer score metadata. In some implementations, the category metadata of applications of a particular application pair in the initial listing of applications can be compared. If it is determined that the applications correspond to the same category (e.g., games, entertainment, educational), the particular application pair is included in the filtered listing of application pairs. If, however, it is determined that the applications do not correspond to the same category, the particular application pair is not included in the filtered listing of application pairs.

The content metadata can indicate particular content of an application. In some implementations, the application content can include adult content, for example. The content metadata of applications of a particular application pair in the initial listing of applications stored in the application database 306 can be compared. If it is determined that the applications correspond to the same content (e.g., adult), the particular application pair is included in the filtered listing of application pairs. If, however, it is determined that the applications do not correspond to the same content, the particular application pair is not included in the filtered listing of application pairs. For example, the content metadata of a first application in a particular application pair can indicate that the first application includes adult content, and the content metadata of a second application in the application pair can indicate that the related application does not include adult content. As a note, although an application marketplace can exclude applications including pornographic content, applications including content that may be deemed to be racy (e.g., applications including content related to lingerie, and/or content related to erotic novels) can still be available from the application marketplace. Continuing with the above example, a comparison of the content metadata of the applications reveals that the content of the applications is different (i.e., the first application includes adult content and the second application does not includes adult content). Consequently, the application pair is not included in the filtered lasting of application pairs.

The title metadata of applications can be processed. The title metadata includes the title of the application that can be displayed to the user, for example, as application name 218 or 238, both shown in FIG. 2. If it is determined that at least one of the applications of a particular application pair includes an empty title (e.g., the title is blank), the particular application pair is not included in the filtered listing of application pairs.

The description metadata of applications can be processed. The description metadata includes information relating to a description of the application that can be displayed to the user. The description metadata can be provided by the developer of the application. If it is determined that at least one of the applications of a particular application pair includes an empty description (e.g., the description is blank), the particular application pair is not included in the filtered listing of application pairs.

The install metadata of applications can be processed. In some implementations, the install metadata includes the total number of installations of the application across multiple computing devices (e.g., computing devices 102). If it is determined that the number of installs of at least one of the applications of a particular application pair is below a minimum number of installs, the application is not included in the filtered listing of applications. In some implementations, the install metadata includes an uninstall ratio of the application. The uninstall ratio is the number of uninstalls of the application per the number of installs of the application (e.g., after install of the application, the user uninstalls the application). If it is determined that the uninstall ratio of at least one of the applications of a particular application pair is above a maximum uninstall ratio, the application pair is not included in the filtered listing of applications.

The rating metadata of applications can be processed. In some implementations, the rating metadata includes a number of ratings of the application. For example, the number of ratings is the total number of individual ratings associated with the application provided by users (e.g. the users 108) of the application. If it is determined that the total number of ratings of at least one of the applications of a particular application pair is below a minimum number of ratings, the particular application pair is not included in the filtered listing of application pairs. In some implementations, the rating metadata includes the average rating of the application. The average rating of the application can be across any subset (or all) of users of the application. If it is determined that the average rating of at least one of the applications in a particular application pair is below a minimum average rating, the application pair is not include in the filtered listing of application pairs.

The locale metadata of applications can be compared. The locale metadata indicates data relating to geographic regions where the application is supported. In some implementations, the locale can indicate a country where the application is supported, for example, China or the United States. In some implementations, the locale can indicate languages into which the application has been translated. For example, a given application can be provided in English and German. If the locale information of applications of a particular application pair indicates an overlap, the application pair is included in the filtered listing of application pairs. For example, if it is determined that the applications include a language overlap (e.g., both applications are provided in English) and/or a country overlap (e.g., both applications are available in the United States), the applications are deemed to correspond to the same locale and the corresponding application pair is included in the filtered listing of application pairs. If, however, it is determined that the applications do not correspond to the same locale, the corresponding application pair is not included in the filtered listing of application pairs.

The developer score metadata of applications can be compared. The developer score can relate to a rating associated with the developer of the application. For example, the developer rating can be based on historical ratings of applications provided by the developer or an average rating of applications provided by the developer. If it is determined that the developer score of at least one of the applications of a particular application pair is below a minimum score, the application pair is not included in the filtered listing of application pairs.

In some implementations, the suggested applications engine 310 processes the scoring metadata of applications in application pairs to generate a metadata score (ms). Specifically, the suggested applications engine 310 compares the scoring metadata of the applications in the application pair to generate the metadata score. The suggested applications engine 310 combines the normalized weight and the metadata score of the applications in the application pairs to provide an overall score, as discussed in further detail below. The scoring metadata can include, for example, title metadata, description metadata and permission metadata.

The title metadata of applications in a particular application pair can be processed and a corresponding similarity score can be generated. Specifically, a similarity of the text of the title metadata of the applications is compared to generate a title similarity score.

The description metadata of applications in a particular application pair can be processed and a similarity score, discussed in further detail below, can be generated. Specifically, a similarity of the text of the description metadata of the applications is compared to generate a description similarity score. The title metadata and the description metadata of the applications in a particular applications pair can be processed and similarity scores can be generated. For example, title metadata of one application and description metadata of another application can be processed to generate a title-description similarity score. The permissions metadata of the applications in a particular application pair can be processed and a corresponding similarity score can be generated. The permissions metadata can include data related to permissions by the applications to accesses APIs (Application Programming Interface) of computing devices (e.g., the mobile device 200), such as the global positioning system (GPS) API or the API of a camera flash.

By way of non-limiting example, the metadata score (ms) for each application pair (Appu, Appv) can be provided using the following relationship:

$$ms_{u,v} = [(k_1 \times ConceptSimilarity_{u,v}) \times$$
$$(k_2 \times TitleSimilarity_{u,v}) \times (k_3 \times Title_u Description_v \; Similarity) \times$$
$$(k_4 \times Title_v Description_u \; Similarity) \times (k_5 \times DescriptionSimilarity_{u,v})] \times$$
$$[(k_6 \times PermissionSimilarity_{u,v}) \times (k_7 \times TitleSimilarity_{u,v})]$$

It is contemplated, however, that other relationships can be used to determine the metadata score.

The ConceptSimilarity$_{u,v}$ is the concept similarity score based on text associated with each of the applications. For example, important words in a document (e.g., the description of an application) can be extracted and expanded to determine the most similar words based on search patterns. For small documents, the expansion can be done directly. The concept similarity score for the documents is defined as a weighted sum of these concepts, where each concept is represented by a list of words.

The TitleSimilarity$_{u,v}$ is the title similarity score based on the similarity of the text of the title metadata between the applications u and v. The Title$_u$Description$_v$ Similarity is the title-description similarity score based on the similarity of the text of the title metadata of application u and the text of the description metadata of application v. The Title$_v$Description$_u$ Similarity is the title-description similarity score based on the similarity of the text of the title metadata of application v and the text of the description metadata of application u. The DescriptionSimilarity$_{u,v}$ is the description similarity score based on the similarity of the text of the description metadata between the applications u and v. The PermissionSimilarity$_{u,v}$ is the permission similarity sore based on the similarity of the permissions metadata between the applications u and v. The variables $k_1$-$k_7$ alter the weighting applied to the respective metadata scores that the variable is associated with.

In an example, the final related applications engine 310 multiplies the metadata score (ms) with the square of the normalized weight (nw) to generate an overall score (os) for a pair of applications. The overall score can be provided as follows:

$$os_{u,v} = (nw_{u,v})^2 \times ms_{u,v}$$

where u=1, . . . m and v=1, . . . m. It is contemplated, however, that other relationships can be used to determine the overall score. The metadata score (ms) can be a calculation of any combination of the metadata scores (e.g., title, description, permissions).

The suggested applications engine 310 can then compare the overall score for application pair of the filtered listing of application pairs to an overall score threshold. The suggested applications engine 310 can then determine whether the applications in the application pair are sufficiently similar based on the overall score such that an application of the application pair can be identified as suggested in view of selection of the other application of the application pair in the index of suggested applications. If the overall score is above the overall score threshold, the suggested applications engine 310 determines that an application of the application pair can be identified as suggested in view of the selection of the other application of the application pair. If the overall score is less than the overall score threshold, the suggested applications engine 310 determines that an application of the application pair cannot be identified as suggested in view of the selection of the other application of the application pair. In some implementations, the suggested applications engine 310 generates the index of suggested applications based on the applications pairs that have an overall score above the overall score threshold.

In some implementations, the overall score can be used to rank suggested applications for display. By way of non-limiting example, the suggested applications engine 310 determines that App2 and App3 are identified as suggested application in view of App1 based on the os$_{1,2}$ and os$_{1,3}$, respectively. In response to a user request to display applications that are suggested in view of App1, App2 and App3 can be displayed in a ranked order based on the overall scores for each application pair. For example, if the overall score os$_{1,2}$ is greater than the overall score os$_{1,3}$, App2 will be displayed higher in the ranked order than App3.

The suggested applications engine 310 provides the index of suggested applications to the suggested applications database 312. The suggested applications database 312 stores the index of suggested applications, shown as mapping 316. The suggested applications database 312 makes the index of suggested applications available to the application marketplace.

Figure 4:
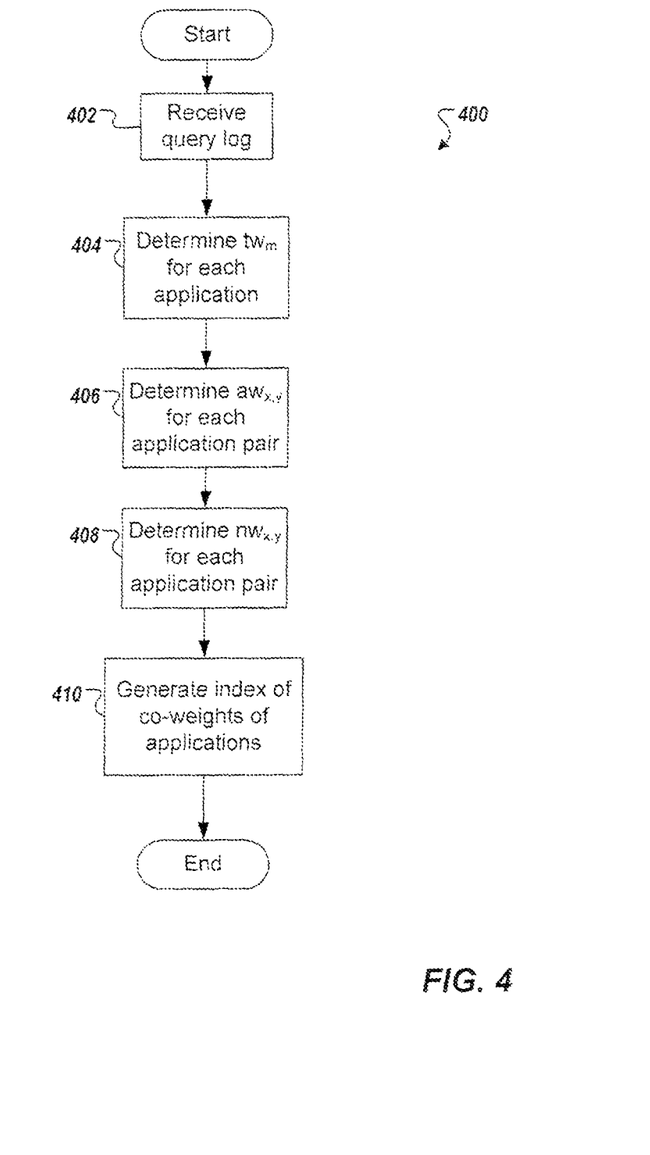
FIG. 4 is a flowchart of an example process that can be executed in accordance with implementations of the present disclosure.

FIG. 4 is a flowchart of an example process 400 that can be executed in accordance with implementations of the present disclosure. The example process 400 can be executed using one or more computing devices. For example, one or more server systems (e.g., the server system 104 of FIG. 1) can be used to execute the example process 400.

A query log is received (402). The total weight $tw_m$ is determined for each application m across all of the hashes (404). For example, the total weight $tw_m$ can be determined as the sum of the squares of each weight for the application m across all of the hashes.

The co-weight $aw_{x,y}$ is determined for each application pair (406). The normalized weight $nw_{x,y}$ of the co-weight $aw_{x,y}$ is determined for each application pair (408). The index of co-weights of applications is generated (410) based on the co-weight $aw_{x,y}$ for each application pair. For example, the index of co-weights of applications is based on the applications pairs that have a normalized weight above the threshold normalized weight.

Figure 5:
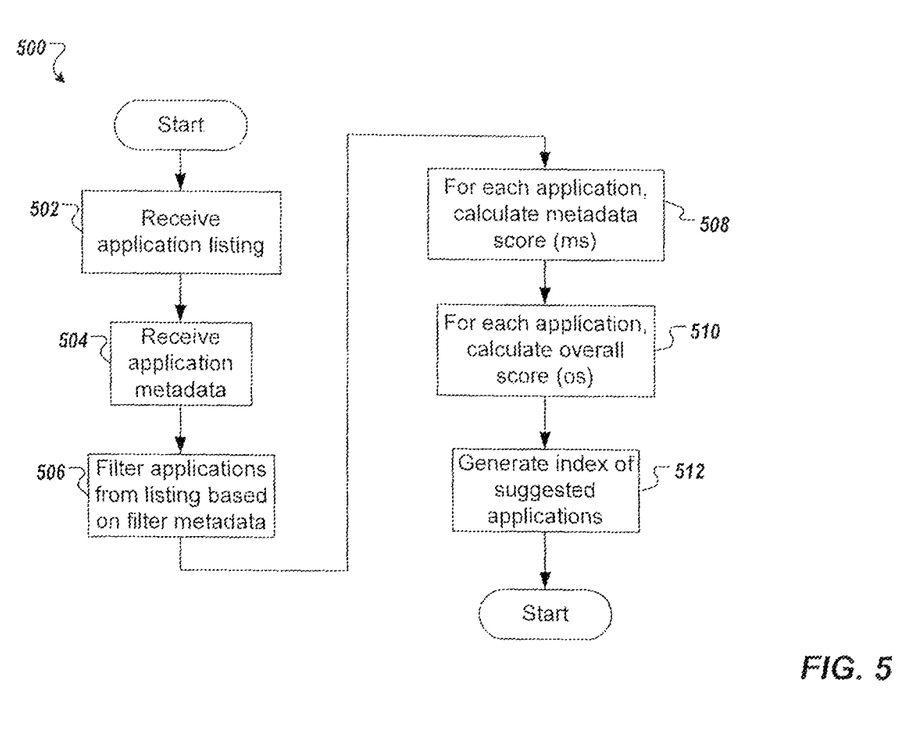
FIG. 5 is a flowchart illustrating an example process for an application listing.

FIG. 5 is a flowchart illustrating an example process 500 for filtering an application listing. The example process 500 can be executed using one or more computing devices. For example, one or more server systems (e.g., the server system 104 of FIG. 1) can be used to execute the example process 500.

A listing of applications is received (502). For example, the initial listing of applications stored in the application database 306 can be received. Application metadata is received (504). The application metadata can include filter metadata and content metadata. Filter metadata can include, for example, category metadata, title metadata, description metadata, install metadata, rating metadata, locale metadata and developer score metadata. Application pairs in the initial listing of applications are filtered based on the filter metadata generating a filtered listing of applications pairs (506). For each applications pair of the filtered listing of application pairs, a metadata score (ms) is calculated based on the scoring metadata (508). For each applications pair of the filtered listing of application pairs, an overall score (os) is calculated based on the normalized weight (nw) and the metadata score (ms) (510).

The index of suggested applications is generated (512). For example, for each applications pair of the filtered listing of application pairs, the overall score is compared to a threshold overall score. If the overall score of the applications pair is greater than the threshold overall score, the applications in the applications pair are included in the index of suggested applications. If the overall score of the applications pair is not greater than the threshold overall score, the applications in the applications pair are not included in the index of suggested applications.

Figure 6:
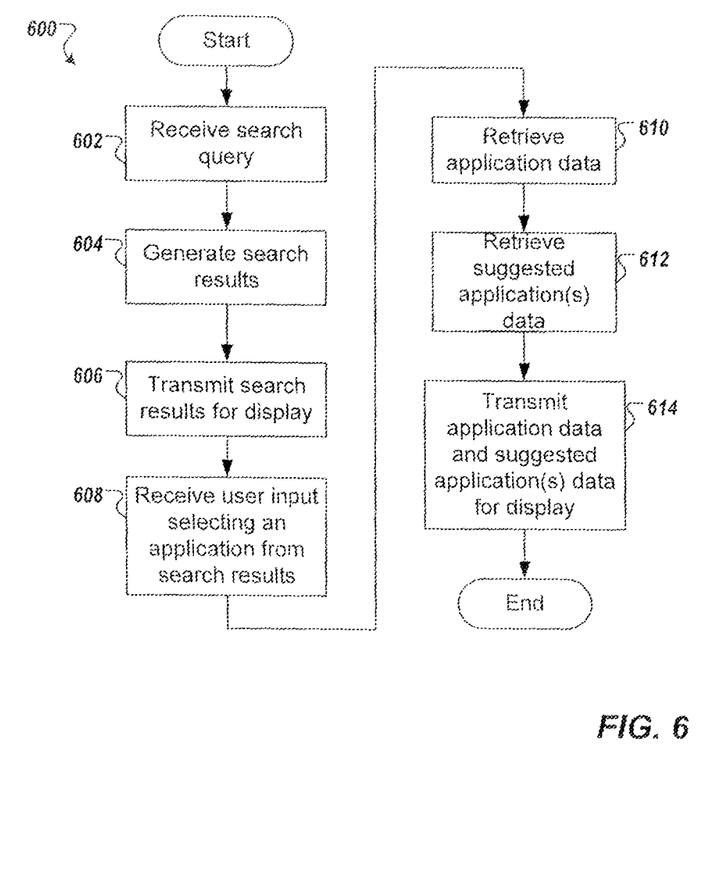
FIG. 6 is a flowchart illustrating an example process for displaying applications identified as suggested applications in view of a selected application.

FIG. 6 is a flowchart illustrating an example process for displaying applications identified as suggested applications in view of a selected application. The example process 600 can be executed using one or more computing devices. For example, one or more server systems (e.g., the server system 104 of FIG. 1) can be used to execute the example process 600.

A search query is received (602). The search query can include search terms related to a specific application or a category of applications. Search results are generated (604). The search results can include a listing of applications that are identified as corresponding to the search terms. The search results are transmitted for display (606). The search results can be displayed on a mobile computing device (e.g. the mobile computing device 200). User input is received indicating a selection of an application from the search results (608). Application data is retrieved (610). For example, the application data is retrieved in response to the user selection of the application. Suggested application(s) data is retrieved (612). The suggested application(s) data correspond to applications that are identified as suggested in view of the selected application. The application data and suggested application(s) data is transmitted for display (614). This data can be displayed on a mobile computing device (e.g. the mobile computing device 200).

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A system, comprising:
   one or more computers; and
   a computer-readable device coupled to the one or more computers having instructions stored thereon which, when executed by the one or more computers, cause the one or more computers to perform operations comprising:
   receiving an initial index, the initial index associating each application of one or more applications with one or more applications of interest to provide one or more application pairs, each application pair associated with a weight that identifies a degree to which the applications of the application pair are related, the applications being executable on a mobile computing device;
   for each application, receiving scoring metadata associated with the application and receiving scoring metadata associated with each of the one or more applications of interest, the scoring metadata comprising title metadata, description metadata, and permission metadata, the permission metadata including data related to permissions by the application and the one or more applications of interest to access an application programming interface of the mobile computing device;
   for each application pair, comparing the scoring metadata associated with the application with the scoring metadata associated with the application of interest;
   based on the comparison, calculating, for each application pair, one or more similarity scores;
   calculating a metadata score based on the one or more similarity scores for each application pair;
   calculating an overall score for each application pair based on a combination of i) the metadata score associated with each application pair and ii) the weight associated with each application pair; and
   removing an application of interest of at least one application pair from the initial index when the overall score of the at least one application pair is less than a threshold score to provide a final index, the final index associating each application of the one or more applications with a remaining one or more applications of interest.

2. The system of claim 1, wherein the metadata comprises filtering metadata.

3. The system of claim 2, further comprising:
   comparing filtering metadata of an application of interest of at least one application pair to filtering criteria; and
   selectively removing the application of interest of the at least one application pair from the initial index based on the comparing.

4. The system of claim 3, wherein the filtering metadata comprises title metadata corresponding to a title of the application of interest and the application of interest is removed from the initial index when the title is blank.

5. The system of claim 3, wherein the filtering metadata comprises description metadata corresponding to a description of the application of interest and the application of interest is removed from the initial index when the description is blank.

6. The system of claim 3, wherein the filtering metadata comprises install metadata corresponding to a number of times the application of interest has been installed on a computing device and the application of interest is removed from the initial index when the number of times is less than a threshold number of times.

7. The system of claim 3, wherein the filtering metadata comprises rating metadata corresponding to ratings of the application of interest.

8. The system of claim 7, wherein the rating metadata comprises an average rating of the application of interest and the application of interest is removed from the initial index when the average rating is less than a threshold average rating.

9. The system of claim 7, wherein the rating metadata comprises a number of ratings corresponding to the application of interest and the application of interest is removed from the initial index when the number of ratings is less than a threshold number of ratings.

10. The system of claim 3, wherein the filtering metadata comprises developer rating metadata corresponding to a rating of a developer of the application of interest and the application of interest is removed from the initial index when the rating is less than a threshold rating.

11. The system of claim 2, further comprising:
comparing filtering metadata of an application of interest of at least one application pair to filtering metadata of an application of the at least one application pair; and
selectively removing the application of interest of the at least one application pair from the initial index based on the comparing.

12. The system of claim 11, wherein the filtering metadata comprises category metadata and the application of interest is removed from the initial index when a category of the application of interest is different from a category of the application.

13. The system of claim 11, wherein the filtering metadata comprises content metadata and the application of interest is removed from the initial index when a content of the application of interest is different from a content of the application.

14. The system of claim 11, wherein the filtering metadata comprises locale metadata and the application of interest is removed from the initial index when a locale associated with the application of interest is different from a locale associated with the application.

15. The system of claim 1, wherein the one or more similarity scores include at least one of a title similarity score, a concept similarity score, a permission similarity score, and title and description similarity scores.

16. The system of claim 1, wherein comparing the scoring metadata associated with the application with the scoring metadata associated with the application of interest further comprises:
comparing a first category of the scoring metadata associated with the application with a second, differing category of the scoring metadata associated with the application of interest,
wherein a particular similarity score of the one or more similarity scores is based on the comparison of the first category of the scoring metadata associated with the application with the second, differing category of the scoring metadata associated with the application of interest.

17. The system of claim 16, wherein the first category includes the title metadata and the second, differing category includes the description metadata.

18. A non-transitory computer storage device encoded with a computer program, the program comprising instructions that when executed by one or more computers cause the one or more computers to perform operations comprising:
receiving a user selection of a particular application of one or more applications available through an application marketplace;
retrieving one or more applications of interest based on the particular application using a final index of applications, the final index provided by removing an application of interest of at least one application pair from an initial index of applications, the initial index of applications associating each application of one or more applications with one or more applications of interest to provide one or more application pairs, each application pair associated with a weight that identifies a degree to which the applications of the application pair are related, the application of interest of the at least one application pair removed from the initial index when the overall score of the at least one application pair is less than a threshold score, the overall score for each application pair based on a combination of i) a metadata score associated with each application pair and ii) the weight associated with each application pair, the metadata score of each application based on one or more similarity scores for each application pair, the one or more similarity scores, for each application pair are calculated based on a comparison of scoring metadata associated with the application with scoring metadata associated with the application of interest, the scoring metadata comprising title metadata, description metadata, and permission metadata, the permission metadata including data related to permissions by the application and the one or more applications of interest to access an application programming interface of a mobile computing device, the final index associating each application of the one or more applications with a remaining one or more applications of interest; and
providing the one or more applications of interest for display.

19. A computer-implemented method comprising:
receiving a user selection of a particular application of one or more applications available through an application marketplace;
retrieving one or more applications of interest based on the particular application using a final index of applications, the final index provided by removing an application of interest of at least one application pair from an initial index of applications, the initial index of applications associating each application of one or more applications with one or more applications of interest to provide one or more application pairs, each application pair associated with a weight that identifies a degree to which the applications of the application pair are related, the application of interest of the at least one application pair removed from the initial index when the overall score of the at least one application pair is less than a threshold score, the overall score for each application pair based on a combination of i) a metadata score associated with each application pair and ii) the weight associated with each application pair, the metadata score of each application based on one or more similarity scores for each application pair, the one or more similarity scores, for each application pair are calculated based on a comparison of scoring metadata associated with the application with scoring metadata associated with the application of interest, the scoring metadata comprising title metadata, description metadata, and permission metadata, the permission metadata including data related to permissions by the application and the one or more applications of interest to access an application programming interface of a mobile computing device, the final index associating each application of the one or more applications with a remaining one or more applications of interest; and
providing the one or more applications of interest for display.

* * * * *